(12) United States Patent
Moffett (10) Patent No.: US 6,201,806 B1
(45) Date of Patent: Mar. 13, 2001

(54) COMMUNICATION SYSTEM AND METHOD OF OPERATION FOR INTERFACING A PRIVATE BRANCH EXCHANGE WITH AN ASYNCHRONOUS TRANSMISSION MODE VOICE AND DATA NETWORK TO PROVIDE SEAMLESS COMMUNICATION ROUTING

(75) Inventor: Alan K. Moffett, Sandy, UT (US)

(73) Assignee: Nortel Networks LTD, Montreal (CA)

( * ) Notice: Subject to any disclaimer, the term of this patent is extended or adjusted under 35 U.S.C. 154(b) by 0 days.

(21) Appl. No.: 08/992,266

(22) Filed: Dec. 17, 1997

(51) Int. Cl.$^7$ .................................................. H04L 12/46
(52) U.S. Cl. ............................................ 370/356; 370/466
(58) Field of Search ..................................... 370/352, 353, 370/354, 355, 356, 401, 402, 395, 466, 467

(56) References Cited

U.S. PATENT DOCUMENTS

| | | | |
|---|---|---|---|
| 5,737,333 | * 4/1998 | Civanlar et al. | 370/352 |
| 5,742,596 | * 4/1998 | Baratz et al. | 370/356 |
| 5,784,371 | * 7/1998 | Iwai | 370/397 |
| 5,926,479 | * 7/1999 | Baran | 370/395 |
| 5,953,331 | * 9/1999 | Duncan et al. | 370/352 |
| 5,991,639 | * 11/1999 | Rautiola et al. | 455/553 |
| 6,009,095 | * 12/1999 | Honma | 370/395 |
| 6,014,378 | * 1/2000 | Christie et al. | 370/356 |

* cited by examiner

Primary Examiner—Min Jung (74) Attorney, Agent, or Firm—Neil Mothew; Bruce E. Garlick; James A. Harrison (57) ABSTRACT

A communication system facilitates both voice and data communications between endpoint devices and includes a switch and at least one peripheral device. The switch includes a switch interface while each peripheral devices includes a peripheral device interface. In combination, the switch and the peripheral device route communications through an asynchronous transfer mode (ATM) network. However, the switch interface and the peripheral device interface operate so that the communications, from the viewpoint of the switch and the peripheral device, are seamlessly transferred in a native communication protocol which may be a time switched protocol. Each peripheral device couples to a respective plurality of endpoint devices. Each peripheral device then connects to the ATM network via a respective peripheral device interface. The switch couples to the ATM network via the switch interface. In its operation, the switch sets up calls from one endpoint device to another endpoint device. In setting up the calls, the switch manages the peripheral devices and determines routing via the ATM network for the call. Such call setup functions may be performed either via a connection to the peripheral device over the ATM network or may be performed on a dedicated control line. The switch also interfaces to the public switched telephone network and routes communications from one endpoint device to another endpoint device via both the ATM network and the public switched telephone network. At least one of the endpoint devices provides both voice and data communications. In such case, the voice communications may be routed by the switch while the data communications may routed by a respective peripheral device if the data communications have a differing destination.

30 Claims, 10 Drawing Sheets

COMMUNICATION SYSTEM AND METHOD OF OPERATION FOR INTERFACING A PRIVATE BRANCH EXCHANGE WITH AN ASYNCHRONOUS TRANSMISSION MODE VOICE AND DATA NETWORK TO PROVIDE SEAMLESS COMMUNICATION ROUTING

BACKGROUND

1. Technical Field

The present invention relates generally to the communication systems; and more particularly to a wired communication system facilitating both voice and data communications, the wired communication system employing an (asynchronous transfer mode) ATM network for a portion of its switching path.

2. Related Art

Wired communication systems that facilitate voice communications are well known in the art. Further, enterprise based wired communication systems are also well known in the art. In such enterprise communication systems, an organization purchases or rents its own switching equipment to facilitate voice communications within the organization. In such systems, the user typically purchases a local switch referred to as a private branch exchange (PBX) to provide local switching for end point devices, such as telephones, as well as to provide an interface to the Public Switched Telephone Network (PSTN).

In its operation, the PBX sets up and routes voice communications between end point devices that are located within the organization. Further, the PBX also sets up communications between the end point devices it serves and distant endpoint device connected to the PBX by an enterprise network or the PSTN. In some enterprise communication systems, peripheral equipment is also installed to service endpoint devices which provide interfaces to a number of endpoint devices. For example, a university or large corporation may have a centrally located PBX and have peripheral equipment located at each physical location where end point devices reside.

The peripheral equipment is linked to the PBX via a dedicated time switched line such as a T1 line. In such systems, the PBX typically sets up all calls between the end point devices. Further, in some systems, the PBX routes all calls within the enterprise communication system. Thus, in some systems, the peripheral equipment acts merely to package calls onto and from the lines linking the PBX to the peripheral equipment. Such packaging of calls, which may be coded in a pulse code modulated (PCM) format, is typically accomplished via a time division multiplexing (TDM) scheme.

As organizations expand at their physical locations, the number of endpoint devices increases, and additional peripheral equipment must be installed to service the additional end point devices. Additional dedicated lines must also be installed from the new peripheral equipment to the PBX. The cost of these lines is often substantial since the lines must typically be leased from a local phone company or be completed with dedicated hardware connections that are expensive to install.

In many organizations, local area networks, wide area networks, and global area networks service data transfer among computer systems operating within the organization. An example of such a network is an asynchronous transfer mode (ATM) network. An ATM network is packet based and is typically a dedicated network having its own set of switches, routers, repeaters and other equipment which is interconnected by dedicated communication lines. Network computers connect either directly to the ATM network or via a bridge between another type of computer network, e.g. an Ethernet network, and the ATM network. Operation of the ATM network is incompatible with the time switched voice communication network since the ATM network is a packet based network and the voice communications network operates in a time switched fashion. Thus, when an organization expands, the ATM network must be expanded in addition to expansion of the voice network to facilitate additional computer resources.

Thus, there is a need in the art for a system that combines resources required for voice communications and data transfer so that required expansions for the transmission of data between computers and required expansions for voice communications in an enterprise type system may combine resources.

SUMMARY OF THE INVENTION

In order to overcome the above described shortcomings of the prior devices, among other limitations, a communication system constructed according to the present invention facilitates both voice and data communications between endpoint devices and includes a switch and at least one peripheral device. The switch includes a switch interface while each peripheral devices includes a peripheral device interface. In combination, the switch and the peripheral device route communications through an asynchronous transfer mode (ATM) network. However, the switch interface and the peripheral device interface operate so that the communications, from the viewpoint of the switch and the peripheral device, are seamlessly transferred in a native communication protocol. In a described embodiment, the native communication protocol is a time switched protocol.

In the construction of the communication system, each peripheral device couples to a respective plurality of endpoint devices. Each peripheral device then connects to the ATM network via a respective peripheral device interface. The switch couples to the ATM network via the switch interface. In its operation, the switch sets up calls from one endpoint device to another endpoint device. In setting up the calls, the switch manages the peripheral devices and determines routing via the ATM network for the call. Such call setup functions may be performed either via a connection to the peripheral device over the ATM network or may be performed on a dedicated control line.

The switch also interfaces to the public switched telephone network and routes communications from one endpoint device to another endpoint device via both the ATM network and the public switched telephone network. At least one of the endpoint devices provides both voice and data communications. In such case, the voice communications may be routed by the switch while the data communications may be routed by the respective peripheral device via the ATM network if the data communications have a differing destination.

Both the switch interface and each peripheral device interface include an input buffer, an output buffer and control circuitry. The control circuitry extracts communication data and link information from ATM cells and, based upon the link information, writes the communication data to the input buffer. The control circuitry also reads communication data from the output buffer, generates link information and builds ATM cells that include the communication data and the generated link information.

In setting up the call, the switch receives destination digits from the first peripheral device and, based upon the destination digits, determines an ATM path for routing of the communication and directs the destination device to receive the communication via the ATM path. Dedicated bandwidth may be established within the ATM network for calls or may be allocated as required. In a described construction, the native communication protocol is time switched and provides endpoint device state information to the switch. Further, the native communication protocol facilitates enhanced services. A method of operation according to the present invention facilitates both voice and data communications. According to the method, a switch sets up and facilitates calls between endpoint devices. In setting up the calls, the switch determines a route for the call to travel, such route including passage on the ATM network between the switch and a peripheral device. Thus, the call is routed through the ATM network from the coupled endpoint device to a destination endpoint device, the call appearing to progress according to the native communication protocol to the switch and the peripheral device.

Moreover, other aspects of the present invention will become apparent with further reference to the drawings and specification which follow.

DETAILED DESCRIPTION OF THE DRAWINGS

Figure 1:
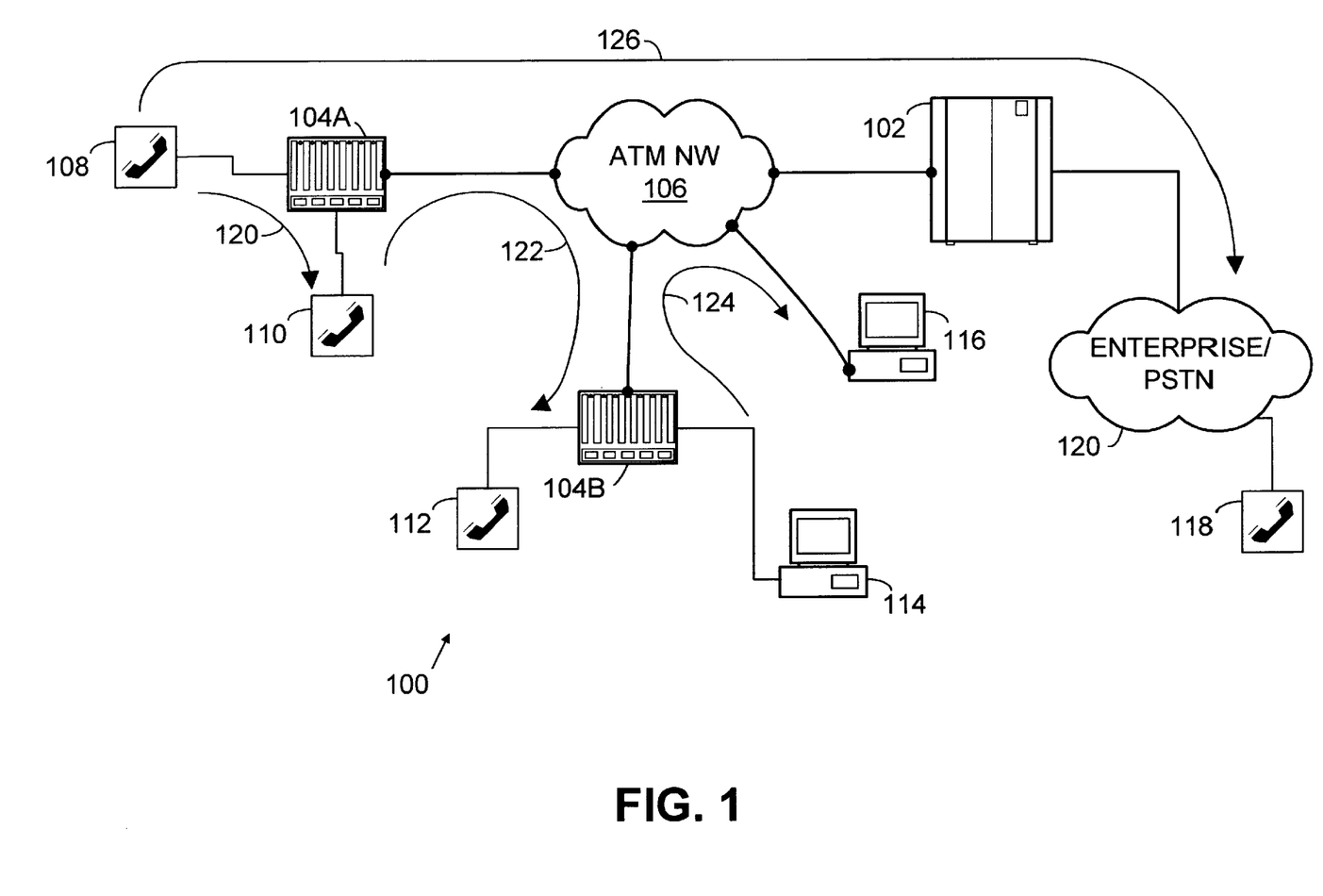
FIG. 1 is a diagram illustrating a communication system constructed according to the present invention that couples at least one peripheral device to a switch via an asynchronous transfer mode (ATM) network.

FIG. 1 illustrates a communication system 100 constructed according to the teachings of the present invention which facilitates voice and data communications. The communication system 100 includes a switch 102 and at least one peripheral device 104A and 104B interconnected via an asynchronous transfer mode (ATM) network 106. The communication system 100 may be installed within an enterprise such as a university, a large corporation, a state agency, or such other enterprise which has substantial intra-network communication requirements and which also requires communication outside of the enterprise.

As illustrated, the switch 102 also connects to the public switched telephone network (PSTN) or an enterprise communication system 120, each of which is dedicated to voice communications and operates in a time switching manner. Thus, the switch 102 operates according to time switching and multiplexing protocols and operations. For example, the switch 120 may be a Northern Telecom Meridian SL-100, commonly used in enterprise installations. Further, the peripheral devices 104A and 104B also operate in a time switching manner. Such peripheral devices 104A and 104B are typically sold with the switch 120 and are commonly used in enterprise installations. However, in usual installations, the switch 102 couples to the peripheral devices 104A and 104B via a time switched link as a T-1 link or a proprietary link that operates according to time division multiplexing (TDM) techniques.

According to the present invention, the switch 102 connects to each of the peripheral devices 104A and 104B via the ATM network 106. The switch 102 and peripheral devices 104A and 104B operate according to time switching principles that are inherently incompatible with the ATM network 106. Thus, the switch 102 includes a switch interface and the peripheral devices 104A and 104B include peripheral device interfaces which, in combination, seamlessly link the switch 102 and the peripheral devices 104A and 104B. The switch interface and peripheral device interfaces cause the switch 102 and peripheral devices 104A and 104B to appear to be linked in a time based fashion.

Each of the peripheral devices 104A and 104B connects to at least one end point device. As is shown, peripheral device 104A connects to end point device telephones 108 and 110. Further, peripheral device 104B connects to telephone 112 as well as to computer 114. As is also shown, a computer 116 may couple directly to the ATM network 106. In such case, the computer 116 has an interface card which provides a point of presence within the ATM network 106. The interface card of the computer 116 allows the computer 116 to communicate in the digitally based ATM protocol.

In its operation, the switch 102 sets up communications from one end point device to another end point device. For example, when end point device 108 desires to communicate with end point device 110, the peripheral device 104A and switch 102 interact such that the communication is routed via path 120. Thus, the control provided by the switch 102 via the ATM network 106 causes a connection to be made via path 120.

The switch 102 also sets up communications between end point devices that are routed via the ATM network 106. For example, a call may be placed at end point device 110 with a desired destination at end point device 112. The switch 102 sets up the communication so that it moves along path 122 through the ATM network 106. Moreover, the switch 102 controls communications between an end point device 108 connected to a peripheral device 104A and an end point device 118 connected to the PSTN 120. In the operation, the switch 102 routes the communication through the ATM network 106 as well as the PSTN 120.

The switch 102 facilitates both voice and data communications within the communication system 100. For example, a digitized data communication emanating from computer 114 which is an end point device and intended for computer 116 that is connected directly to the ATM network 106 is routed via peripheral 104B and the ATM network 106 to reach the computer destination 116. In this communication, the peripheral device 104B, operating in conjunction with the computer 114 packages data received from the computer 114 in a time based format to the digital format of the ATM network 106 so that it may be received by the computer 116. Likewise, the peripheral device 104B converts packetized data received from the computer 116 via the ATM network 106 into time based communications received by the computer 114. However, in another embodiment, the peripheral device includes a secondary ATM interface that couples directly to the computer 114. In embodiment, the peripheral device forwards data in an ATM format between the computer 114 and the ATM network 106. Thus, communication system 100 uses the ATM network 106 for both its data transfer functions and also to route voice communications throughout the communication system 100.

The communication system 100 constructed according to the present invention causes communications between the switch 102 and the peripheral devices 104A and 104B to proceed according to a native communication protocol. The native communication protocol is time switched and compatible with the internal protocols of such products as the Northern Telecom Meridian SL-100 switch and related peripheral device. Such operation is possible because the switch interface and peripheral device interfaces cause the ATM network 106 to appear seamless to the switch 102 and peripheral devices 104A and 104B. As will be described in detail herein, the switch interface and peripheral device interfaces appear to the switch and peripheral devices 104A and 104B as standard native communication protocol devices similarly to the appearance of a T1 link. Thus, the communication system 100 advantageously uses the ATM network 106 for both voice and data communications, thus reducing costs. The communication system 100 also supports enhanced services such as call waiting, call forwarding, caller ID, message waiting lamps and Advanced Intelligent Network functions that would otherwise be unavailable using the ATM network 106. Without using the native protocol for such enhanced services, they would otherwise be unavailable.

Figure 2:
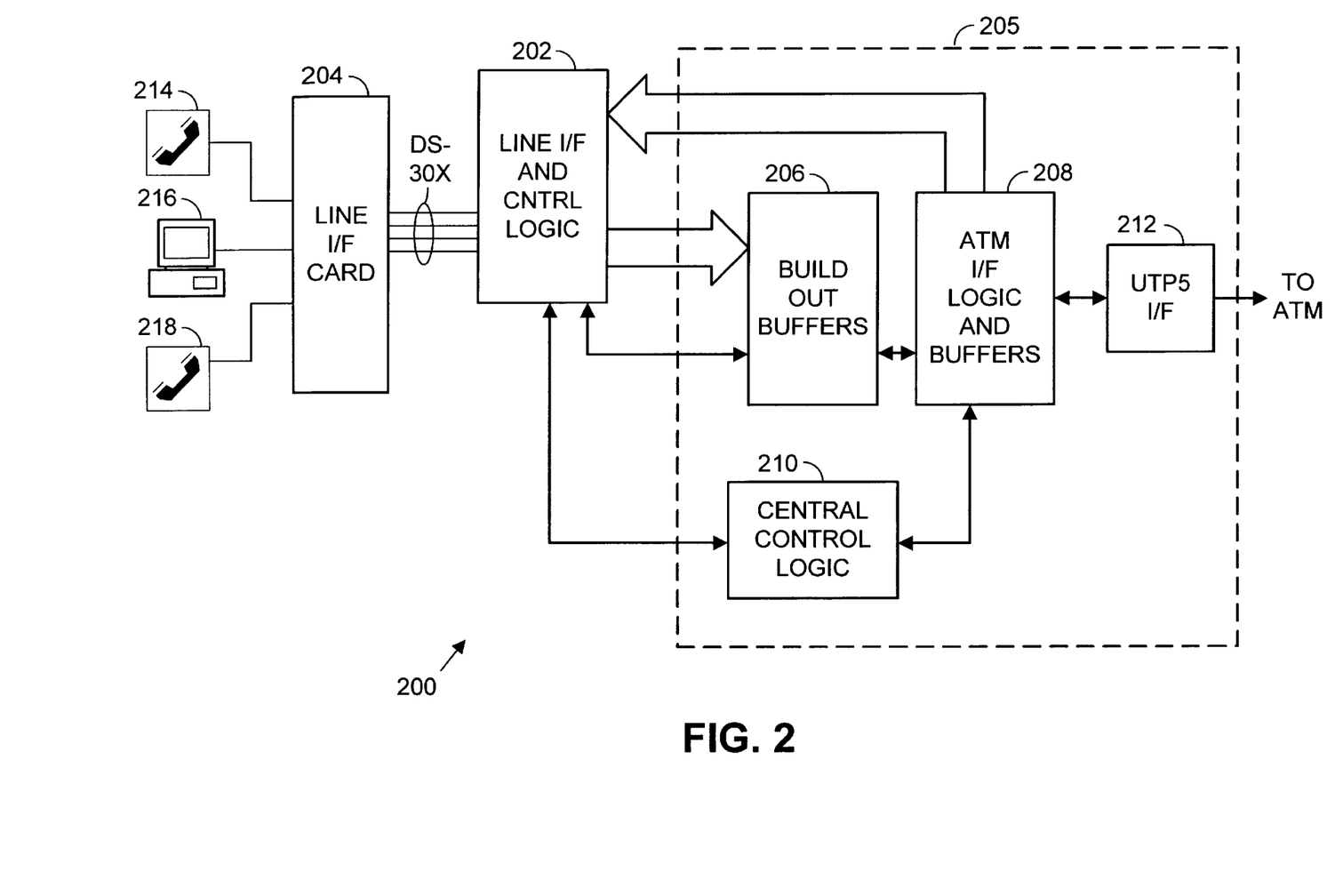
FIG. 2 is a block diagram illustrating a peripheral device constructed according to the present invention.

FIG. 2 illustrates portions of a peripheral device 200 constructed according to the present invention. The peripheral device 200 includes line interface and control logic 202, a line interface card 204 and a peripheral device interface 205. The peripheral device interface 205 includes build out buffers 206, ATM interface logic and buffers 208, central control logic 210, and a unshielded twisted pair, level 5 (UTP-5) interface 212. However, in another embodiment, a fiber optic link may take the place of the UTP-5 interface 212 or operate in conjunction with the UTP-5 interface 212 via separate medium. The peripheral device interface 205 may be constructed as an interface card that interfaces to the peripheral device 200 as does a T1 card, for example.

The line interface card 204 couples to end point devices 214, 216, and 218 and communicates with the line interface and control logic 202 via a DS-30X loop. In a typical installation, the line interface and control logic 202 supports a number of line interface cards 204 even though only a single line interface card 204 is shown. The line interface and control logic 202 generally supports other types of interfaces as well.

The line interface card 204 is capable of supporting 16 end point devices, each of which communicates with the line interface card 204 via both a data channel and a voice channel. Thus, thus the line interface card 204 has 32 ports with PCM data and user equipment messaging combined in a channel. Information (voice and data) from the line interface card 204 is collected, transmitted, and received in the form of serial streams of 32 aggregated channels. Such aggregated channels correspond to the DS-30X loops. Each of the 16 slots in the line interface and control logic 204 terminates one DS-30X loop, except for four slots that are used to terminate two loops each. Thus, in total, 640 channels (20 loops×32 channels) may be supported by one of the peripheral devices. However, in practice, 512 (16 slots×32 channels) ports support 256 end point devices. Such is the case because channel zero of each DS-30X loop is used for messaging.

In combination, the build out buffers 206, ATM interface logic and buffers 208, central control logic 210, and the UTP-5 interface 212 comprise the peripheral device interface 205. In operation, the line interface and control logic reads PCM data from the build out buffer 206. The build out buffer 206 compensates for cell variations, among other functions. The ATM logic and buffers 208 builds ATM cells and derives timing. The ATM interface logic and buffers 208 also provides the functions necessary to interface into the ATM network via the UTP-5 interface 212. The central control logic 210 coordinates operation between the line interface and control logic 202 and the ATM interface logic and buffers 208. Further, in combination, the central control logic 210 and the ATM interface logic and buffers 208 provides control and supervisory messaging. Such supervisory messaging and control are also presented to the ATM interface logic and buffers 208 for transport through the ATM network 206.

Figure 3:
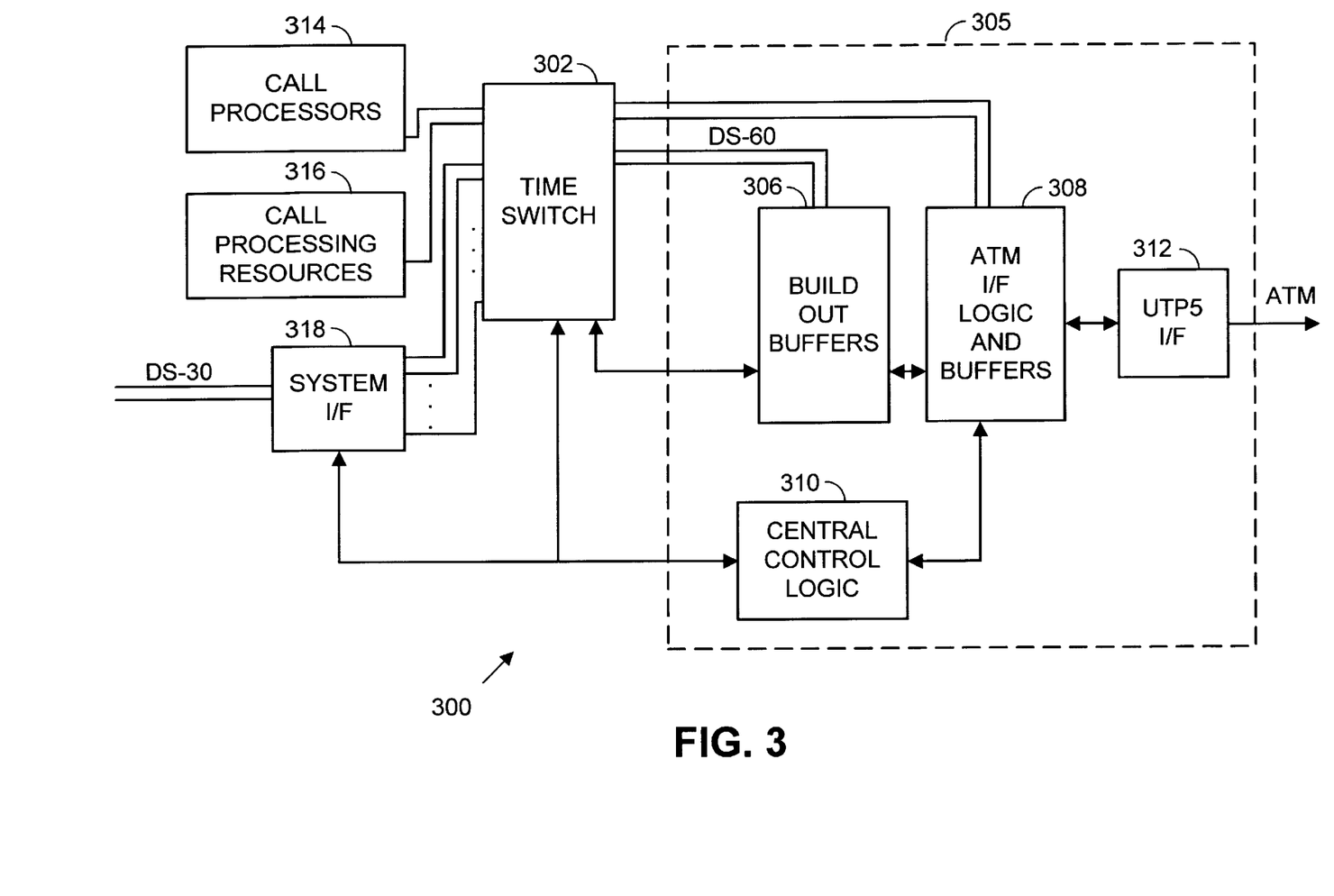
FIG. 3 is a block diagram illustrating a switch constructed according to the present invention.

FIG. 3 illustrates a switch 300 constructed according to the present invention. The switch 300 includes a time switch 302, a switch interface 305, call processors 314, call processing resources 316 and a system interface 318. The switch interface 305 includes build out buffers 306, ATM interface logic and buffers 308, central control logic 310 and a UTP-5 interface 312 that interfaces the switch 300 to the ATM. A plurality of switches, such as the switch 300, form a typical installed switch such as a Northern Telecom Meridian SL-100. Thus, the components of switch 300 are shown only to illustrate the principles of the present invention and would comprise a portion of an actual installed switch.

In its operation, the time switch 302 performs local switching between input and output ports. 640 network side ports to the right of the time switch 302 and 512 system side ports to the left of the time switch 302 are selectively interconnected during operation of the time switch 302. Several of the system side ports are connected to the call processors 314 and the call processing resources 316. The call processors 314, which are typically redundantly installed, perform call processing functions such as providing tone signals, ringing signals and other functions. Further, the call processing resources 316 provide additional functions required in operation of the switch 300.

The switch 300 connects to a time switch (not shown) via a DS-30 link coupled to the system interface 318. The DS-30 link is a proprietary Northern Telecom interface. The function of the DS-30 link is to forward messaging and maintenance functions from a larger supervisory computing device via the time switch to the switch 300 and other connected devices as well as to interconnect the devices coupled via DS-30 links to the time switch.

The build out buffers 306 and the ATM interface logic and buffers 308 connect to the time switched via a DS-60 interface. The DS-60 interface provides 640 network side ports which may connect to network side cards other than the switch interface 305. For example, other network side cards may include T-1 cards, proprietary interface cards and other cards that link communications to the switch 300.

Within the switch interface 305, the central control logic 310 operates in conjunction with the system interface 318, time switch 302, and ATM interface logic and buffers 308 to coordinate the conversion of data in the DS-60 format to that of the ATM format and in reverse. Thus, the switch interface of the switch 300 converts information sent over the ATM network and received from the ATM network and to the DS-60 protocol such that the connection between the switch 300 and peripheral devices appears seamless to both the switch and to the peripheral devices. Operation to cause the seamless conversion between the ATM packetized format and the DS-60 time based format will be further described herein.

Figure 4:
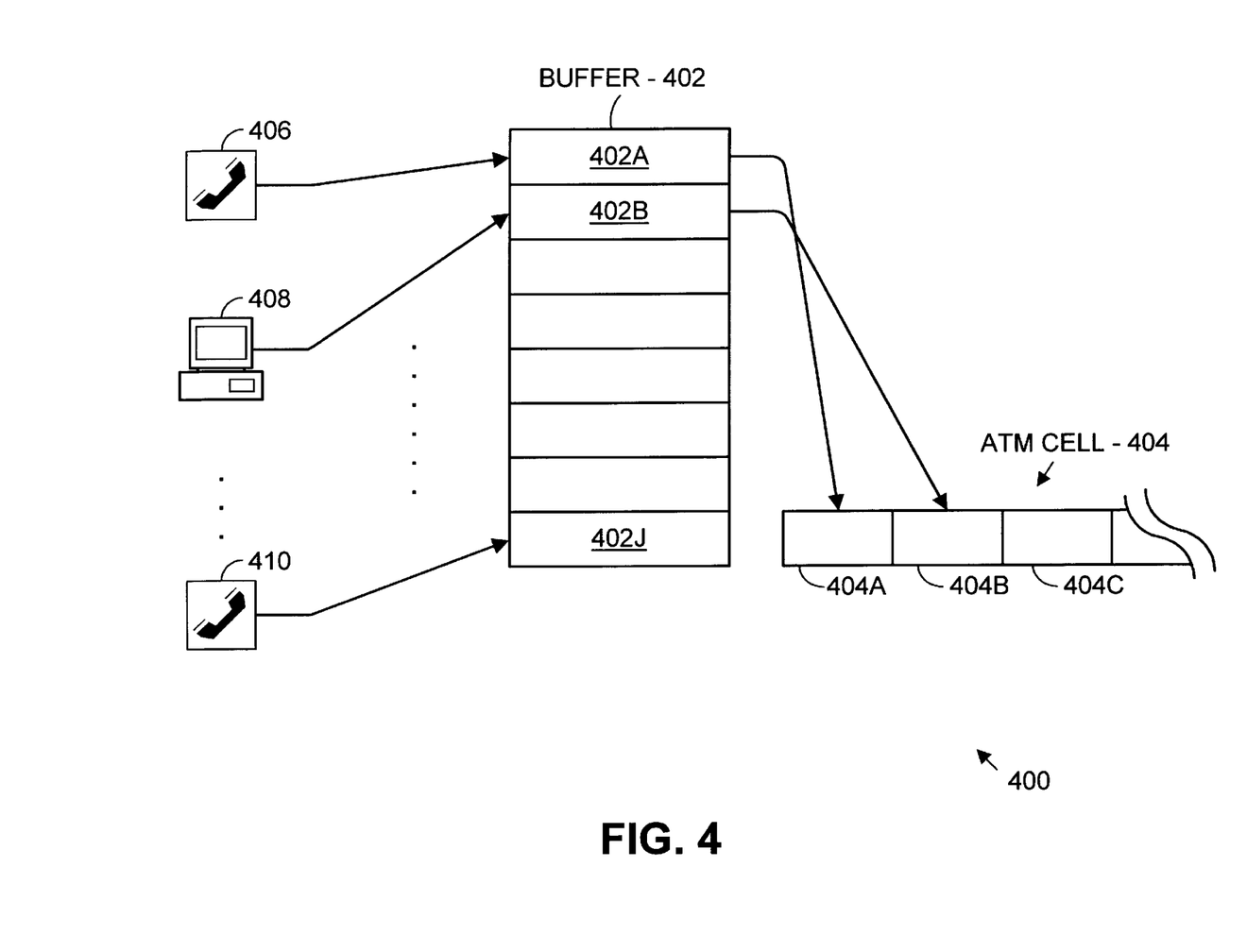
FIG. 4 is a block diagram illustrating construction of ATM cells according to the present invention.

FIG. 4 illustrates mapping 400 of data from end point devices 406, 408, and 410 to an ATM cell 404. Such mapping is performed both in the switch interface of the switch and in the peripheral device interfaces of at least one peripheral device. In the present illustration, the operation shown corresponds to a packaging of data or calls received from the end point devices 406, 408, and 410 and sent via the ATM network in ATM cell 404. Prior to mapping data to the ATM cell 404, data from the endpoint Operation of ATM networks is generally known and will not be described further herein except as to expand upon the teachings of the present invention. In general, however, virtual paths and channels may be established between interconnected switches that form the ATM networks. In one embodiment of the present invention, virtual channels and connections are set up for each path via the ATM network between peripheral devices. For example, with reference to FIG. 1, path 122 between a peripheral device 104A and peripheral device 104B coincides with a virtual ATM path. On the path 122, dedicated bandwidth has been established to service calls between end point devices 108 and 110 and end point devices 112 and 114. However, in other embodiments, this virtual path 122 may be enabled and disabled based upon the current bandwidth requirements for communications between peripheral device 104A and peripheral device 104B.

The construction illustrated in FIG. 4 assumes a specific mapping for a particular period in time. This specific mapping writes data or communication from end point device 406 into buffer location 402A. Likewise, the mapping associates data or communication from end point device 408 into buffer location 402B. Moreover, the mapping has data from end point device 410 written into buffer location 402J of buffer 402. For each ATM cell cycle, data received from the end point devices 406, 408, and 410 is written to the buffer 402. Once the ATM cell 404 is full, the ATM cell 404 is routed via the ATM network to a destination where it is processed to be consistent with the native protocol of the destination device. Each location within the ATM cell 404 will then be repackaged to appear as a time division of a TDM channel, for example, such that each portion of the TDM channel corresponds to a correct control parameter or endpoint device.

Figure 5A:
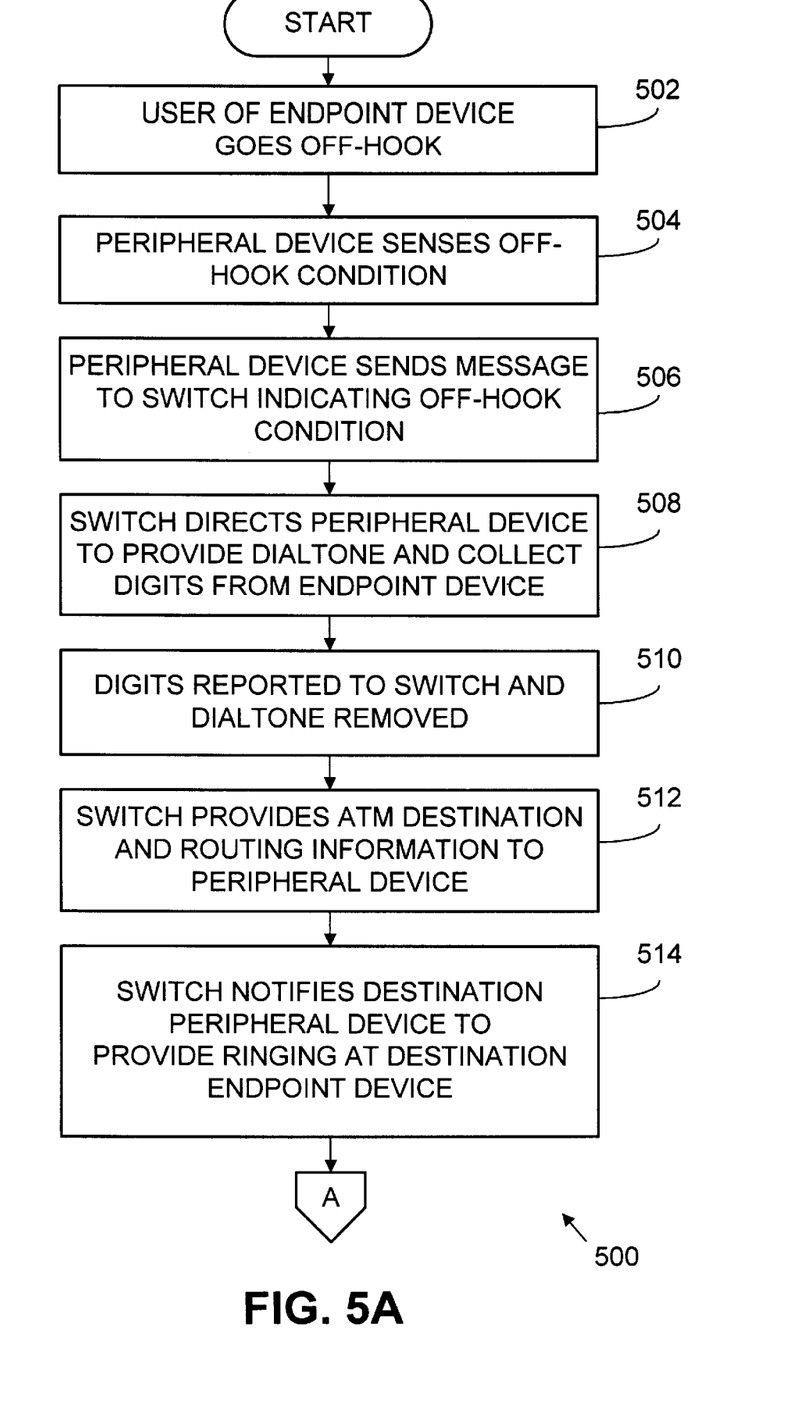
FIGS. 5A and 5B are logic diagrams illustrating operation of a communication system constructed according to the present invention in servicing a call via the ATM network.
Figure 5B:
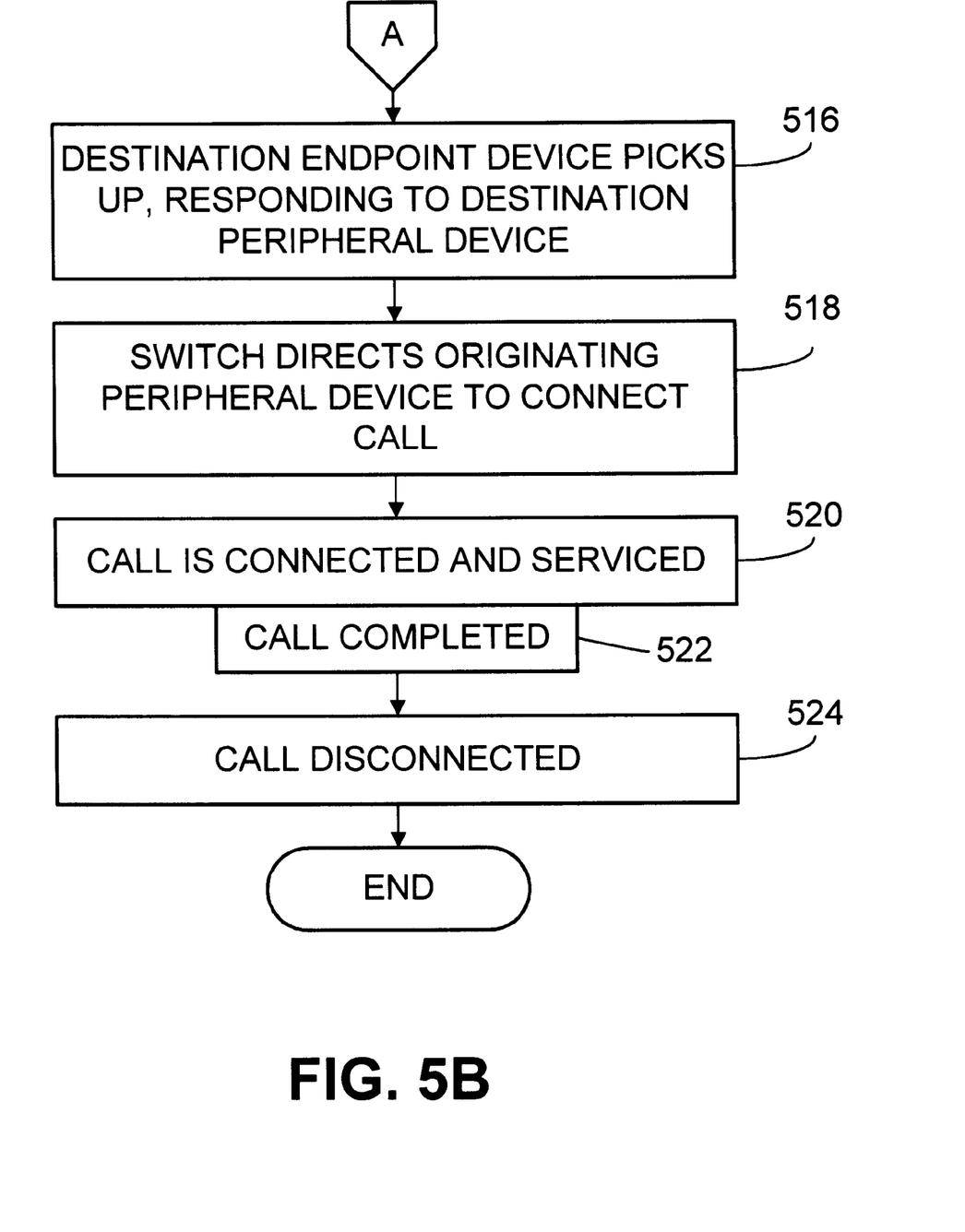

FIGS. 5A and 5B illustrate operation of at least one peripheral device and a switch, both constructed according to the present invention, in servicing a call using the ATM network in routing the call. With particular reference to FIG. 5A, operation 500 commences at step 502 wherein a user of an end point device goes off-hook. The originating peripheral device then senses the off-hook condition at step 504 and sends a message to the switch indicating the off-hook condition at step 506. The originating peripheral device sends such indication via the ATM network. As was previously described, such operation occurs via the ATM network in a manner that is transparent to both the originating peripheral device and the switch, appearing to be in the native communication protocol of each.

The switch then directs the originating peripheral device to provide a dial tone and collect the digits from the end point device at step 508. The originating peripheral device then provides a dial tone to the end point device and collects the digits from the end point device. Then, at step 510, the originating peripheral device reports the digits to the switch and removes the dial tone. Next, at step 512 the switch provides an ATM destination and ATM routing information to the originating peripheral device for routing of the call. Such destination and routing information is intercepted by the originating peripheral device interface, used to route ATM information thereafter and to build information in the native protocol that was received via the ATM network. Control type communications between the switch and the originating peripheral device are assumed to be performed via the ATM in the illustrated embodiment. However, in other embodiments, a dedicated network may be provided for such control communications.

After step 512 completes, the switch notifies the destination peripheral device to provide ringing at the destination end point device at step 514. Such operation, for example, is illustrated in FIG. 1 as routing a call along path 122 between originating peripheral device 104A and destination peripheral device 104B. As was previously described, bandwidth required to service the call may exist along path 122 or may be allocated at step 514.

Moving now to FIG. 5B, operation proceeds to step 516 wherein the destination end point device picks up in response to the ringing. The destination end point device then responds to the destination peripheral device indicating the off-hook condition. Then, at step 518, the switch directs the originating peripheral device to connect the call to the destination peripheral device. The call is connected and serviced at step 520 with such servicing continued until the call is completed at step 522. After the call has been completed, operation proceeds to step 524 wherein the call is disconnected.

Figure 6A:
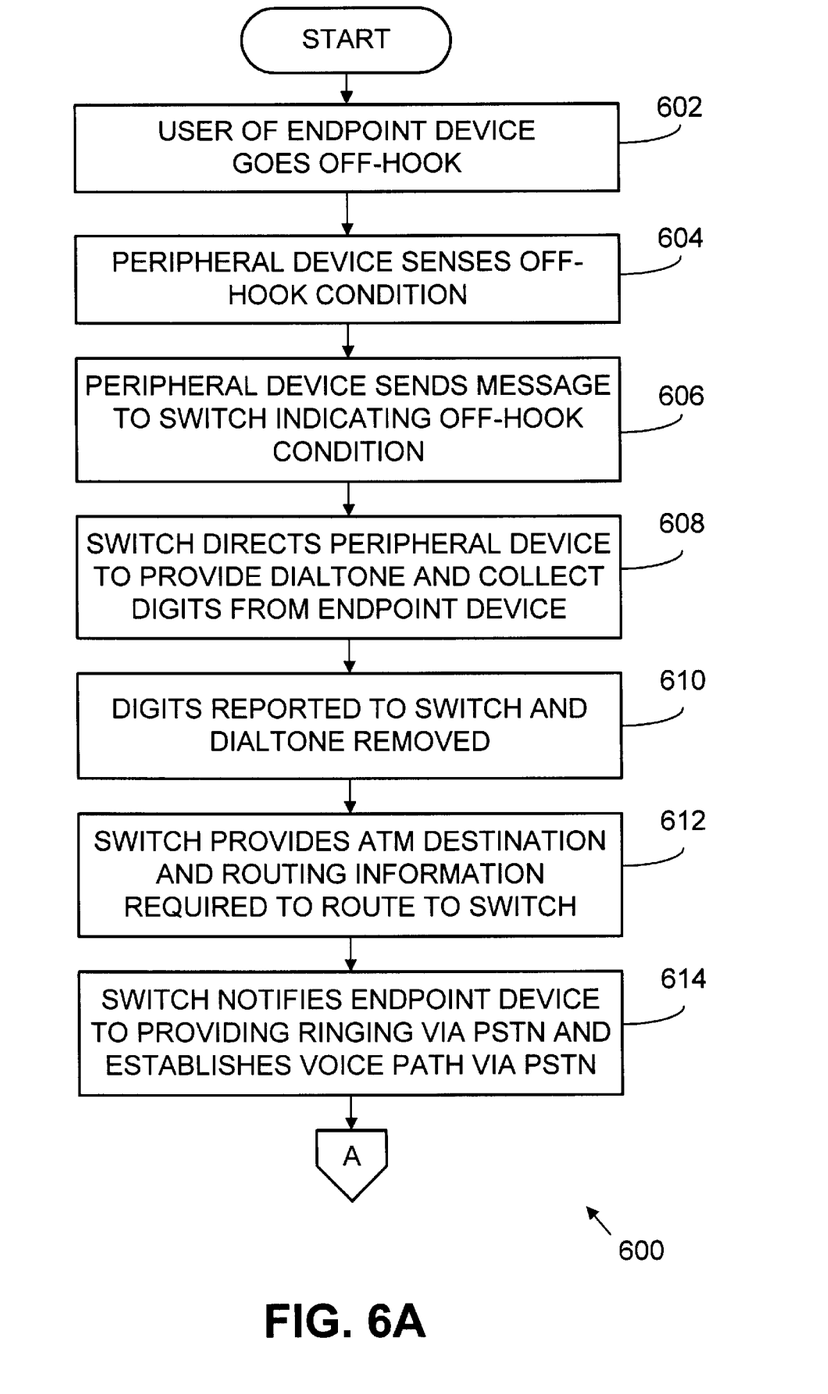
FIGS. 6A and 6B are logic diagrams illustrating operation of a communication system constructed according to the present invention in routing a call via both the ATM network and the public switched telephone network.
Figure 6B:
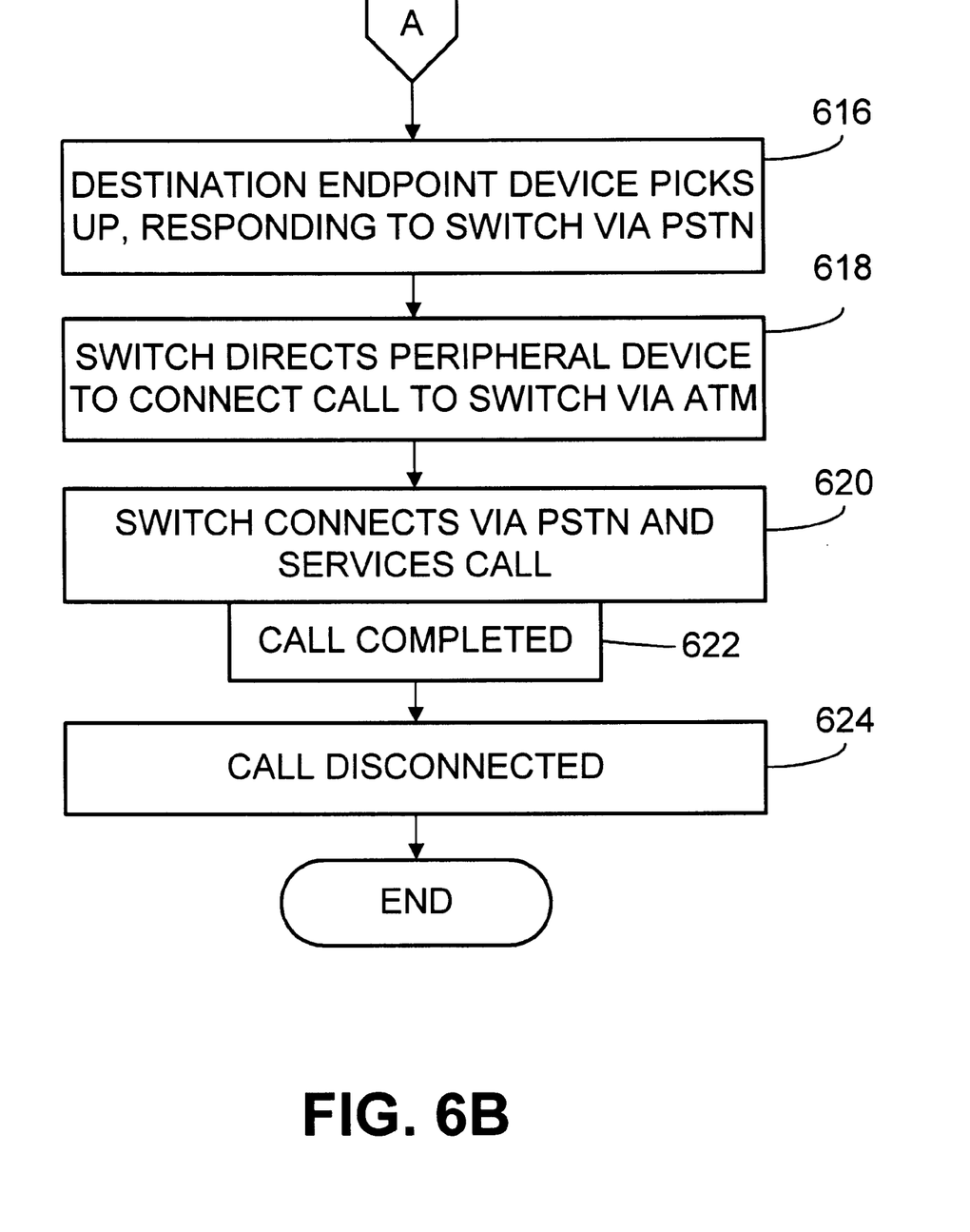

FIGS. 6A and 6B illustrate operation of a communication system constructed according to the present invention in connecting a call between an end point device coupled to a peripheral device and an end point device coupled to the PSTN. Operation commences at step 602 wherein a user of the end point device takes the end point device off-hook. The peripheral device senses the off-hook condition at step 604 and sends a message to the switch indicating the off-hook condition at step 606. At step 608, the switch directs the peripheral device to provide a dial tone to the end point device and to collect the digits from the end point device. After such digits are collected the peripheral device reports the digits to the switch and removes the dial tone at step 610.

Next, at step 612, the switch provides the ATM destination and ATM routing information required to route a call from the peripheral device to the switch at step 612. Then at step 614, the switch notifies a destination end point device via the PSTN, requesting that the end point device provide ringing. At such time, at step 614, the switch also establishes a voice path to the destination end point device via the PSTN. An example of such routing is illustrated in FIG. 1 for example, with a call routed between source endpoint device 112 and destination end point device 118. In such case, the switch 102 routes the call through the peripheral device 104B, the ATM network 106, itself and the PSTN 120.

Next, moving to FIG. 6B, a user of the destination end point device picks up the destination endpoint device in response to the ringing at step 616. Then, at step 618, the switch directs the peripheral device to connect the call to the switch via the ATM network. Once the connection is made via the ATM network, the switch connects the call to the endpoint device via the PSTN and services the call at step 620. The call is serviced until it is completed at step 622. Once completed, the call is disconnected at step 624.

Figure 7:
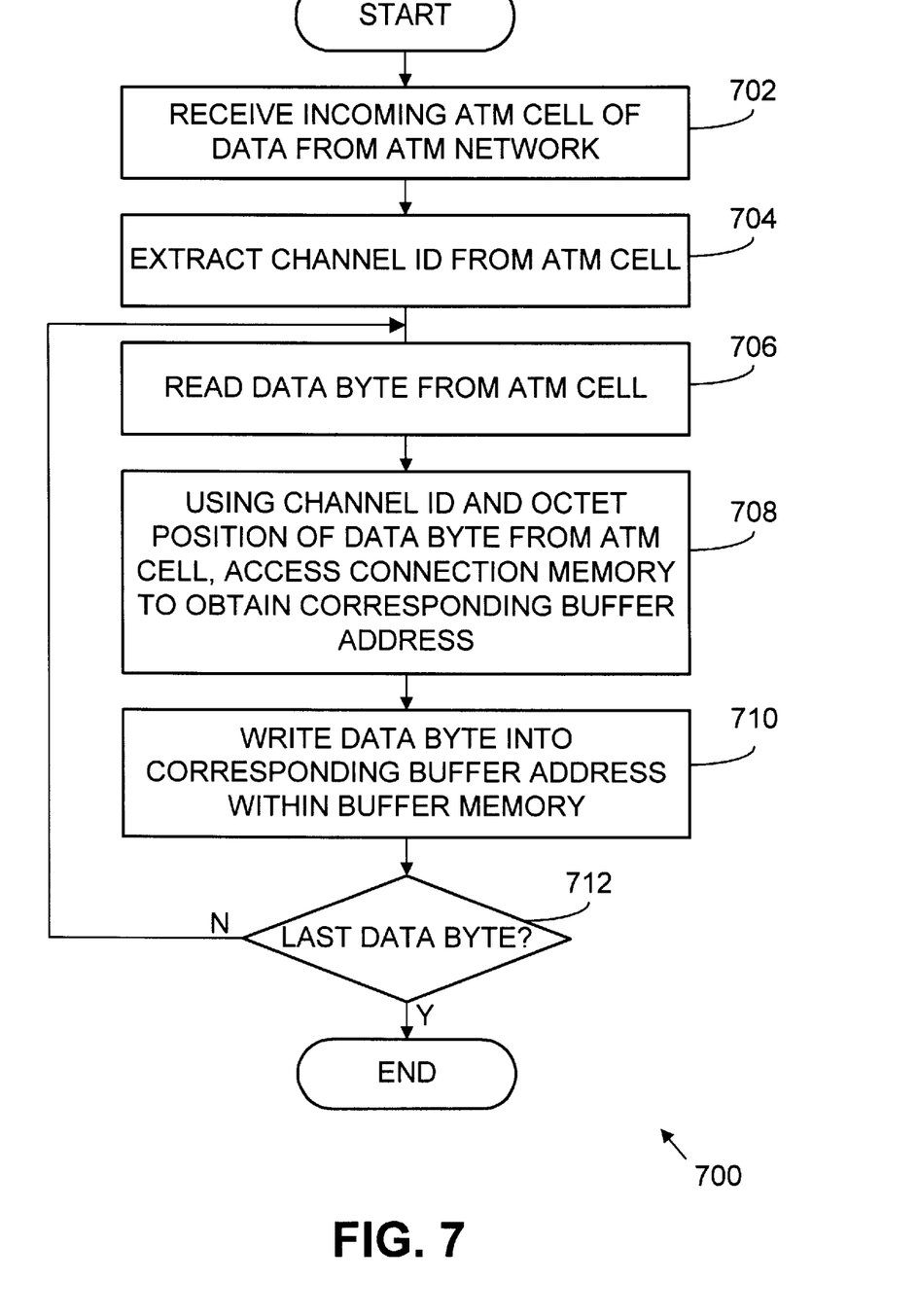
FIG. 7 is a logic diagram illustrating the conversion of data from an ATM format to a native protocol format.

FIG. 7 illustrates operation of either a switch or peripheral device constructed according to the present invention in packaging ATM data into a native communication protocol format. Operation 700 commences at step 702 wherein an incoming ATM cell of data is received from the ATM network. In a described embodiment, the ATM cell includes 48 or fewer bytes of data. However, in other embodiments, the ATM cell could comprise differing sizes including greater or lesser amounts of data. Next, at step 704, the channel I.D. is extracted from the ATM cell. The channel I.D. is used in determining how to repackage the data into the native communication protocol. For example, with the native communication protocol being a TDM protocol, the channel I.D. will be investigated to determine how the ATM data flowing in from the ATM network is to be provided so as to appear that it was time switched. Then at step 706, a data byte is read from the ATM cell. Typically, in a first execution of step 706, a first data byte is read from the ATM cell while in subsequent operations of step 706, subsequent bytes of data are read from the ATM cell. However, in other embodiments, the data bytes may be read in different orders.

Next, at step 708, using the channel I.D. and octet position of the data byte from the ATM cell, a connection memory is accessed to obtain a corresponding buffer address. The corresponding buffer addresses refer to the build out buffers illustrated in FIGS. 2 and 3. Then, at step 710, the data byte is written to a corresponding buffer address within the buffer memory such that is resides in a proper location for subsequent building into the native communication protocol format. Then, at step 712, it is determined whether that was the last data byte for the particular incoming ATM cell. If not, operation proceeds to step 706. If the current data byte was the last data byte of the cell, operation is complete.

Figure 8:
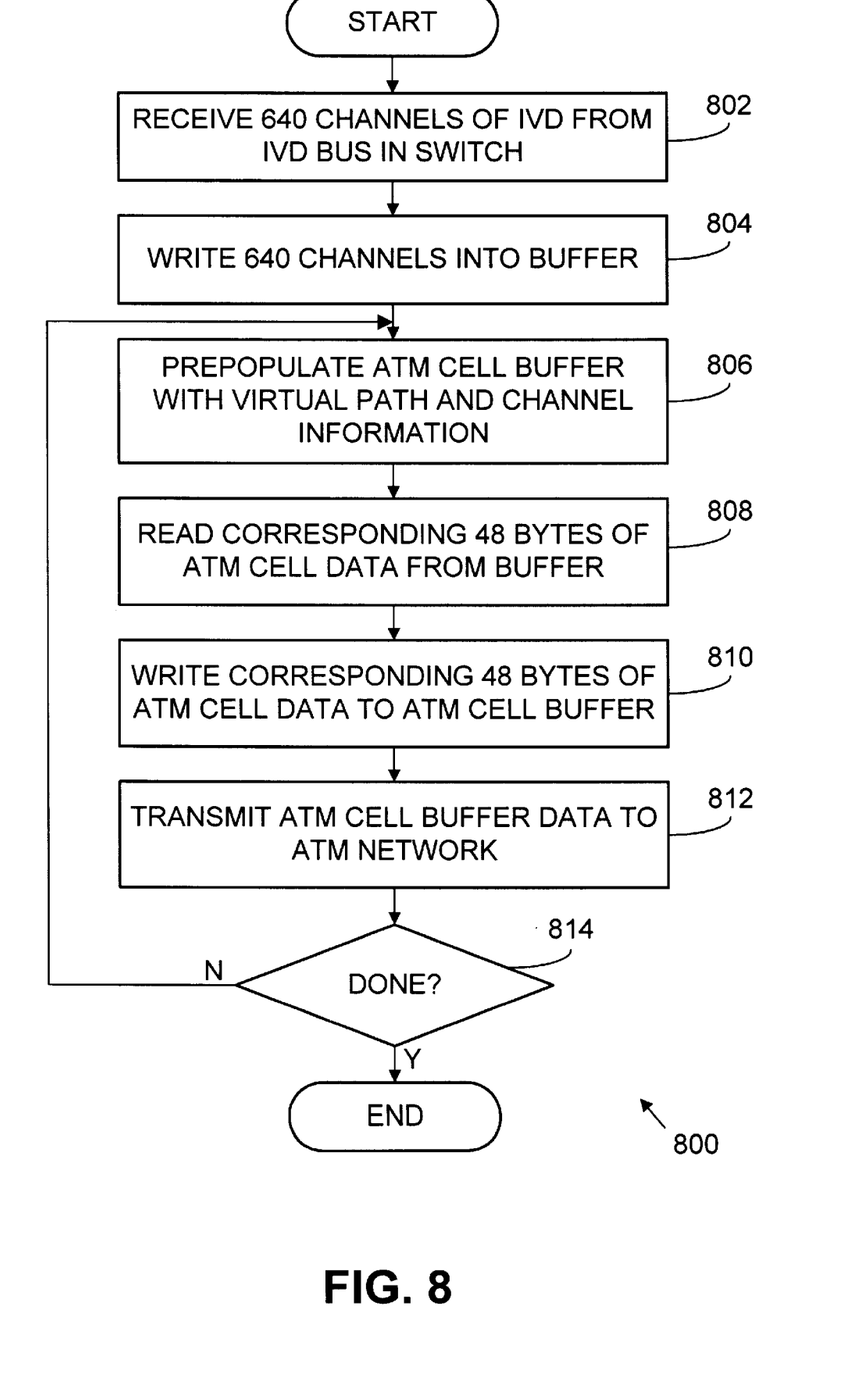
FIG. 8 is a logic diagram illustrating construction of ATM cells from data in a native protocol format.

FIG. 8 illustrates operation in constructing ATM cells from data received in a native communication protocol. Such operations are performed in the switch interface and the peripheral device interfaces previously described. Operation commences at step 802 wherein the interface receives 640 channels of integrated voice and data (IVD) from the IVD bus in the peripheral device. Upon receipt, at step 804, the 640 channels of IVD are written into the buffer. Such buffer may correspond to the ATM interface buffer illustrated in FIGS. 2 and 3. Next, at step 806, the ATM cell buffer is pre-populated with virtual path and channel information. As was previously described, virtual paths and channels are allocated for transfers made via the ATM. Thus, for each ATM cell having a particular destination and channel, such information is pre-populated into the ATM cell prior to placing the data into the cell.

Next, at step 808, 48 bytes of information corresponding to the particular ATM cell are read from the buffer. Then, at step 810, the 48 bytes of ATM cell data are written to the ATM cell buffer. Such ATM cell data corresponds to the destination for the particular ATM cell. Then, at step 812, the ATM cell buffer data is transmitted to the ATM network. Such transmission would typically be performed by UTP-5 or fiber optic interface such as that illustrated in FIG. 3. Finally, at step 814, it is determined whether the 640 channels of data have been written to ATM cells. If not, operation returns to step 806. However, if such operation is complete for the 640 channels of data the process ends.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A communication system facilitating voice and data communications, the communications system comprising:
   a switch coupled to an asynchronous transfer mode network via a switch interface;
   at least one peripheral device coupled to the asynchronous transfer mode network via a respective peripheral device interface with each peripheral device also coupled to a plurality of respective endpoint devices;
   the switch setting up communications from one endpoint device to another endpoint device, wherein, in setting up the call, the switch receives destination information from a first peripheral device and, based upon the destination information, determines an asynchronous transfer mode path for routing of the communication and directs the destination device to receive the communication via the asynchronous transfer mode path; and
   the switch interface and the at least one respective peripheral device interface providing communications from the one endpoint device to the another endpoint device via the asynchronous transfer mode network such that the communications appear to proceed according to a native communication protocol.

2. The communication system of claim 1, wherein the switch further interfaces to the public switched telephone network and routes communications from one endpoint device to another endpoint device via both the asynchronous transfer mode network and the public switched telephone network.

3. The communication system of claim 1
   at least one of the endpoint devices providing both voice and data communications;
   the voice communications routed by the switch; and
   the data communications routed by a respective peripheral device.

4. The communication system of claim 1, wherein the switch interface comprises:
   an input buffer;
   an output buffer;
   control circuitry that extracts communication data and link information from asynchronous transfer mode cells and, based upon the link information, writes the communication data to the input buffer; and
   the control circuitry also reading communication data from the output buffer, generating link information and building asynchronous transfer mode cells that include the communication data and the generated link information.

5. The communication system of claim 1, wherein the peripheral device interface comprises:
   an input buffer;
   an output buffer;
   control circuitry that extracts communication data and link information from asynchronous transfer mode cells and, based upon the link information, writes the communication data to the input buffer; and
   the control circuitry also reading communication data from the output buffer, generating link information and building asynchronous transfer mode cells that include the communication data and the generated link information.

6. The communication system of claim 1, wherein the switch sets up a call initiated at a first endpoint device connected to a first peripheral device and terminated at a second endpoint device connected to a second peripheral device.

7. The communication system of claim 1, wherein, in setting up the call, the switch receives destination digits from the first peripheral device and, based upon the destination digits, determines an asynchronous transfer mode path for routing of the communication and directs the destination device to receive the communication via the asynchronous transfer mode path.

8. The communication system of claim 1, wherein the native communication protocol provides endpoint device state information to the switch.

9. The communication system of claim 1, wherein the native communication protocol facilitates enhanced services.

10. The communication system of claim 1, wherein the native communication protocol is a time switched protocol.

11. A method of operating a communication system that facilitates both voice and data communications, the method comprising:

receiving a call request at a first peripheral device from a coupled endpoint device;

transmitting the call request from the first peripheral device to a switch via an asynchronous transfer mode network, the call request converted from a native protocol at the first peripheral device to an asynchronous transfer mode protocol;

receiving the call request at the switch in the asynchronous transfer mode protocol and converting the call request to the native protocol; and the switch setting up a call based upon the call request, wherein, in setting up the call, the switch receives destination digits from the first peripheral device and, based upon the destination digits, determines an asynchronous transfer mode path for routing of the communication and directs the destination device to receive the communication via the asynchronous transfer mode path, and further wherein, the call is routed through the asynchronous transfer mode network from the coupled endpoint to a destination endpoint device, the call appearing to progress according to the native communication protocol to the switch and the peripheral device.

12. The method of claim 11, further comprising routing the call via the public switched telephone network to an endpoint device connected to the public switched telephone network.

13. The method of claim 11, wherein both voice and data communications are supported.

14. The method of claim 11, further comprising the steps of:

extracting communication data and link information from asynchronous transfer mode cells as they are received;

based upon the link information, writing the communication data to an input buffer; and constructing communication data in the native communication protocol from the communication data in the input buffer and a determined mapping of the input buffer.

15. The method of claim 11, further comprising the steps of:

writing communication data received in the native communication protocol to an output buffer;

generating link information based upon ongoing calls;

building asynchronous transfer mode cells that include the communication data and the generated link information.

16. The method of claim 11, further comprising:

setting up a call initiated at a first endpoint device connected to a first peripheral device and terminated at a second endpoint device connected to a second peripheral device; and routing the call from the first peripheral device to the second endpoint device.

17. The method of claim 11, wherein, in setting up the call, the switch receives destination digits from the first peripheral device and, based upon the destination digits, determines an asynchronous transfer mode path for routing of the communication and directs the destination device to receive the communication via the asynchronous transfer mode path.

18. The method of claim 11, wherein the native communication protocol provides endpoint device state information to the switch.

19. The method of claim 11, wherein the native communication protocol facilitates enhanced services.

20. The method of claim 11, wherein the native communication protocol is a time switched protocol.

21. A method of operating a communication system that facilitates both voice and data communications, the method comprising:

receiving a call request at a peripheral device from a coupled endpoint device;

transmitting the call request from the peripheral device to a switch;

receiving the call request at the switch; and the switch setting up a call based upon the call request;

routing the call through an asynchronous transfer mode network from the coupled endpoint device to a destination endpoint device;

converting communications from a native communication protocol to an asynchronous transfer mode protocol prior to transmission on the asynchronous transfer mode network;

transmitting the communications via the asynchronous transfer mode network; and converting communications from the asynchronous transfer mode protocol to the native communication protocol so that it appears to the switch and the peripheral device the call appears to progress according to the native communication protocol.

22. The method of claim 21, further comprising routing the call via the public switched telephone network to an endpoint device connected to the public switched telephone network.

23. The method of claim 21, wherein both voice and data communications are supported.

24. The method of claim 21, further comprising the steps of:

extracting communication data and link information from asynchronous transfer mode cells as they are received;

based upon the link information, writing the communication data to an input buffer; and constructing communication data in the native communication protocol from the communication data in the input buffer and a determined mapping of the input buffer.

25. The method of claim 21, further comprising the steps of:
  writing communication data received in the native communication protocol to an output buffer;
  generating link information based upon ongoing calls;
  building ATM cells that include the communication data and the generated link information.

26. The method of claim 21, further comprising:
  setting up a call initiated at a first endpoint device connected to a first peripheral device and terminated at a second endpoint device connected to a second peripheral device; and
  routing the call from the first peripheral device to the second endpoint device.

27. The method of claim 21, wherein, in setting up the call, the switch receives destination digits from the first peripheral device and, based upon the destination digits, determines an ATM path for routing of the communication and directs the destination device to receive the communication via the ATM path.

28. The method of claim 21, wherein the native communication protocol provides endpoint device state information to the switch.

29. The method of claim 21, wherein the native communication protocol facilitates enhanced services.

30. The method of claim 21, wherein the native communication protocol is a time switched protocol.

* * * * *